United States Patent
Matsugashita

(10) Patent No.: US 9,306,923 B2
(45) Date of Patent: Apr. 5, 2016

(54) IMAGE FORMING APPARATUS, METHOD FOR CONTROLLING IMAGE FORMING APPARATUS, AND STORAGE MEDIUM THEREFOR

(71) Applicant: CANON KABUSHIKI KAISHA, Tokyo (JP)

(72) Inventor: Hayato Matsugashita, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 137 days.

(21) Appl. No.: 14/038,570

(22) Filed: Sep. 26, 2013

(65) Prior Publication Data
US 2014/0090028 A1    Mar. 27, 2014

(30) Foreign Application Priority Data
Sep. 27, 2012 (JP) .................. 2012-214268

(51) Int. Cl.
*G06F 7/04* (2006.01)
*G06F 15/16* (2006.01)
*G06F 17/30* (2006.01)
*H04L 29/06* (2006.01)
*G06F 21/41* (2013.01)
(Continued)

(52) U.S. Cl.
CPC ............... *H04L 63/08* (2013.01); *G06F 21/41* (2013.01); *G06F 21/608* (2013.01); *H04L 63/0815* (2013.01); *G06F 21/00* (2013.01); *G06F 21/121* (2013.01); *H04L 63/00* (2013.01); *H04L 63/0807* (2013.01)

(58) Field of Classification Search
CPC ..... H04L 63/00; H04L 63/08; H04L 63/0807; H04L 63/0815; G06F 21/00; G06F 21/121; G06F 21/30; G06F 21/41

USPC ............................. 726/1–10, 27–29
See application file for complete search history.

(56) References Cited

U.S. PATENT DOCUMENTS 8,544,069 B1 * 9/2013 Subbiah et al. .................. 726/4
8,745,718 B1 * 6/2014 Dufel .................. H04L 63/0807
713/155

(Continued)

FOREIGN PATENT DOCUMENTS

EP    1646179 A1    4/2006
EP    2485459 A1    8/2012
(Continued)

OTHER PUBLICATIONS

XP055094505, "How to Authenticate Web Users with Windows Azure Active Directory Access Control", <http://www.windowsazure.com/en-us/documentation/articles/active-directory-dotnet-how-to-use-access-control/> pp. 1-20.
(Continued)

*Primary Examiner* — Jayesh Jhaveri
(74) *Attorney, Agent, or Firm* — Canon USA Inc. IP Division

(57) ABSTRACT

When a request for acquiring authorization information is received from a resource service application that is a request source, an image forming apparatus transmits a request for further delegating an authorization delegated from a user to the resource service application to an authorization server system together with first authorization information, and acquires second authorization information issued based on the first authorization information from the authorization server system.

12 Claims, 11 Drawing Sheets

(51) Int. Cl.
*G06F 21/60* (2013.01)
*G06F 21/00* (2013.01)
*G06F 21/12* (2013.01)

(56) References Cited

U.S. PATENT DOCUMENTS

| | | | |
|---|---|---|---|
| 8,819,784 B2* | 8/2014 | Monjas Llorente | H04L 63/105 726/3 |
| 2006/0075474 A1* | 4/2006 | Takeuchi et al. | 726/5 |
| 2008/0184354 A1 | 7/2008 | Yamakazi | |
| 2009/0254978 A1* | 10/2009 | Rouskov | G06F 21/335 726/4 |
| 2010/0125894 A1* | 5/2010 | Yasrebi et al. | 726/4 |
| 2011/0109427 A1 | 5/2011 | Mihira et al. | |
| 2011/0321176 A1 | 12/2011 | Matsugashita | |
| 2012/0086980 A1 | 4/2012 | Numata | |
| 2012/0204233 A1* | 8/2012 | Rubio | 726/4 |
| 2012/0254957 A1* | 10/2012 | Fork | G06F 21/33 726/6 |
| 2012/0291114 A1* | 11/2012 | Poliashenko et al. | 726/8 |
| 2013/0036455 A1* | 2/2013 | Bodi | H04L 63/10 726/4 |
| 2014/0013396 A1* | 1/2014 | Field-Eliot | H04L 63/0807 726/4 |
| 2014/0033278 A1* | 1/2014 | Nimashakavi | G06F 21/335 726/4 |
| 2014/0245389 A1* | 8/2014 | Oberheide et al. | 726/3 |
| 2014/0282919 A1* | 9/2014 | Mason | H04L 63/0807 726/4 |
| 2014/0310769 A1* | 10/2014 | O'Neill et al. | 726/1 |
| 2015/0007283 A1* | 1/2015 | Brugger et al. | 726/5 |

FOREIGN PATENT DOCUMENTS

| | | |
|---|---|---|
| JP | 2012-008958 A | 1/2012 |
| KR | 10-0863204 B1 | 10/2008 |
| KR | 10-2012-0038892 A | 4/2012 |

OTHER PUBLICATIONS

Hardt, D., Ed., "The OAuth 2.0 Authorization Framework", Chapter 1. Introduction, pp. 7-22, Oct. 2012, Internet Engineering Task Force (IETF) Proposed Standard.

D. Hardt, the OAuth 2.0 Authorization Framework Draft-IETF-OAuth-v2-21, Jul. 31, 2012, OAuth Working Group, Internet Draft, 72 pages.

Office Action received from EPO on Jul. 8, 2015.

Hardt, D. "The OAuth 2.0 Authorization Framework drat-ieff-oauth-v2-31", Jul. 31, 2012.

* cited by examiner

FIG.4A

USER MANAGEMENT TABLE ~1200

| USER ID ~1201 | PASSWORD ~1202 | USER TYPE ~1203 |
|---|---|---|
| uid00000001 | ************ | USER |
| dev00000001 | ************ | CLIENT |
| uid00000002 | ************ | USER |

FIG.4B

CLIENT MANAGEMENT TABLE ~1300

| CLIENT ID ~1301 | CLIENT NAME ~1302 | REDIRECTION URL ~1303 | SERIAL NUMBER ~1304 |
|---|---|---|---|
| dev00000001 | ************ | https://dev01/redirect | #0000001 |

FIG.4C

AUTHORIZATION TOKEN MANAGEMENT TABLE ~1400

| AUTHORIZATION TOKEN ID ~1401 | TOKEN TYPE ~1402 | EXPIRATION DATE ~1403 | SCOPE ~1404 | REFRESHING TOKEN ID ~1405 | REFRESHING EXPIRATION DATE ~1406 | CLIENT ID ~1407 | USER ID ~1408 | APPLICATION ID ~1409 |
|---|---|---|---|---|---|---|---|---|
| AT_000000 | AUTHORIZATION CODE | 2013/09/30 11:00:00 | RESOURCE A | | | dev00000001 | uid00000001 | |
| AT_000001 | PARENT TOKEN | 2013/09/30 12:00:00 | RESOURCE A | RT_000001 | 2014/09/30 12:00:00 | dev00000001 | uid00000001 | |
| AT_000002 | CHILD TOKEN | 2013/09/30 13:00:00 | RESOURCE A | | | dev00000001 | uid00000001 | app00000001 |
| AT_000003 | PARENT TOKEN | 2013/09/30 16:00:00 | RESOURCE A | RT_000002 | 2014/09/30 16:00:00 | dev00000001 | uid00000002 | |

FIG.5A

1500 DEVICE USER MANAGEMENT TABLE

| USER ID (1501) | PASSWORD (1502) | IC CARD INFORMATION (1503) |
|---|---|---|
| user001 | ******** | ****** |
| user002 | ******* | ****** |
|  |  |  |

FIG.5B

1600 DEVICE MANAGEMENT TABLE

| CLIENT ID (1601) | CLIENT SECRET (1602) | ENDPOINT URL (1603) | REDIRECTION URL (1604) |
|---|---|---|---|
| dev00000001 | **************** | https://authz/oauth | https://dev01/redirect |

FIG.5C

1700 PARENT TOKEN MANAGEMENT TABLE

| USER ID (1701) | AUTHORIZATION TOKEN ID (1702) | REFRESHING TOKEN ID (1703) |
|---|---|---|
| user001 | AT_000001 | RT_000001 |
| user002 | AT_000003 | RT_000002 |
|  |  |  |

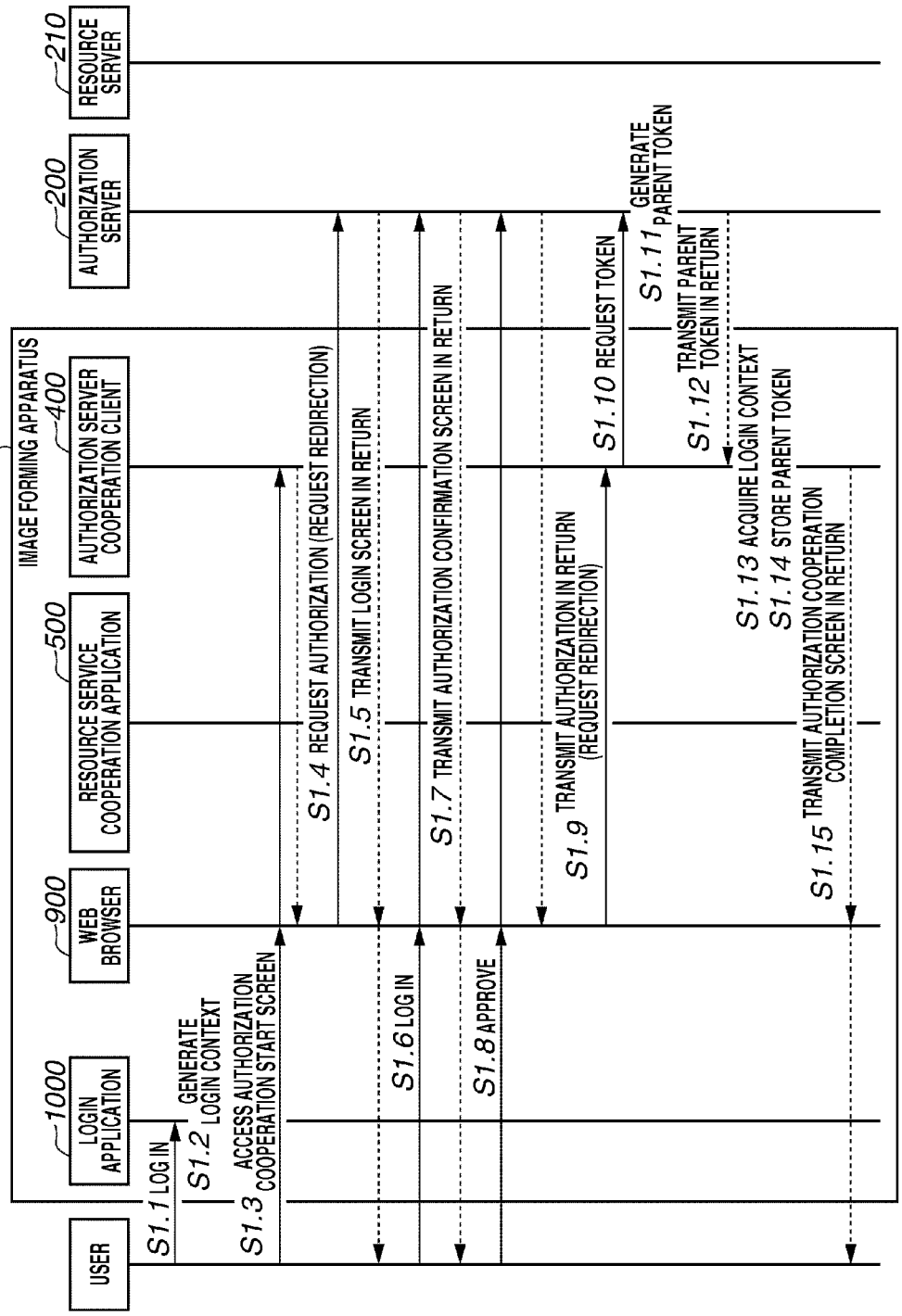

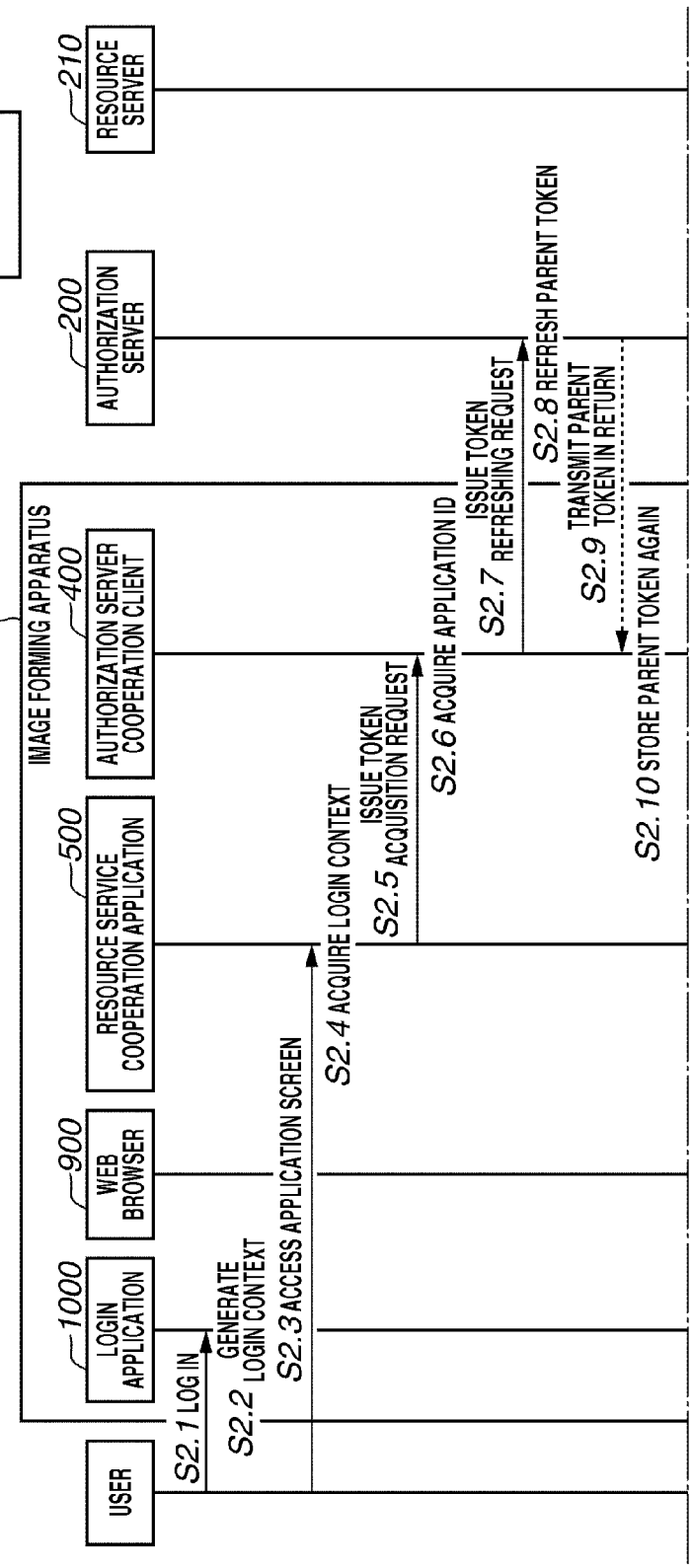

FIG.10A
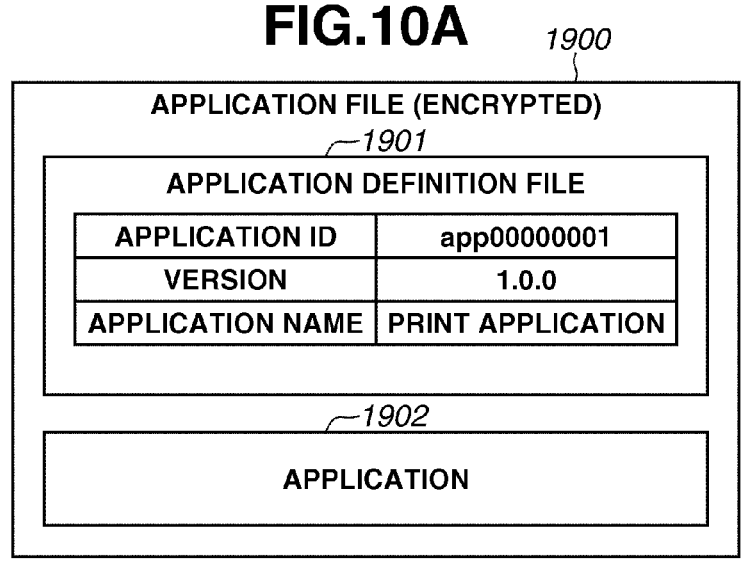
FIG.10B
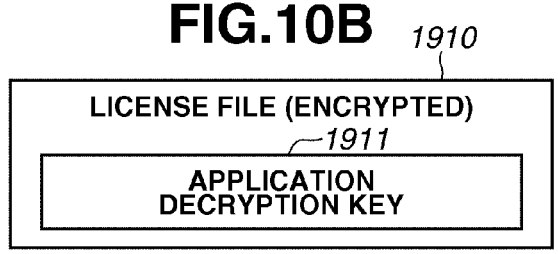
FIG.10C
| APPLICATION MANAGEMENT TABLE ||||| 
| APPLICATION ID | VERSION | APPLICATION NAME | STORAGE LOCATION | STATUS |
| --- | --- | --- | --- | --- |
| app00000001 | 1.0.0 | PRINT APPLICATION | ¥¥¥work¥app00000001 | INSTALLED |
| app00000002 | 1.0.0 | AUTHORIZATION SERVER COOPERATION CLIENT | ¥¥¥work¥app00000002 | STARTED |
|  |  |  |  |  |

IMAGE FORMING APPARATUS, METHOD FOR CONTROLLING IMAGE FORMING APPARATUS, AND STORAGE MEDIUM THEREFOR

BACKGROUND OF THE INVENTION

1. Field of the Invention

The present invention relates to an image forming apparatus to which a user's authorization is delegated, a method for controlling the image forming apparatus, and a storage medium therefor.

2. Description of the Related Art

In recent years, there have become widely operated servers that provide a service for generating an electric document in the format of Portable Document Format (PDF), and a service for storing this electric document to a terminal via the Internet. By using the services via the terminal, users can generate an electric document even if the terminal does not have the function of generating an electric document, and can also store electric documents beyond the storage capacity of the terminal.

Further, as the cloud technique is drawing attention, opportunities for creating a new added value by using a plurality of services in cooperation are expanding more than ever. Examples of possible use of services in cooperation include directly storing an electric document in the PDF format generated by using a service into another service without an intervention of a terminal. On the other hand, an issue arises from the cooperative use of services.

The issue is that, if information pieces more than the user's desire are exchanged between the services, this exchange increases a risk of a leak of user data and personal information. It is undesirable that a service other than a service for providing a result desired by a user acquires user data, personal information, and the like when the services cooperate. On the other hand, for a provider of a service, an easily implementable system is favorable as the mechanism for the service cooperation.

Under these circumstances, there has been developed a standard protocol for realizing cooperation of authorization, referred to as Open Authorization (OAuth) (refer to Japanese Patent Application Laid-Open No. 2012-008958). Implementing OAuth in a plurality of services allows, for example, an external service B, which is approved to access a service A under a specific authorization granted by a user, to access the service A without using authentication information of the user. At this time, the service A is configured to require a user's explicit approval, i.e., authorization to the access by the external service B after clearly notifying the user of the content of the authorization such as data supposed to be accessed by the external service B and a service range supposed to be used by the external service B. The term "authorization operation" is used to refer to a user's operation of explicitly granting an approval via an authorization screen.

Once the user performs the authorization operation, the service A provides a specific authorization approved by the user to the external service B. Then, the external service B directly or indirectly receives a token that proves the external service B's right to access the service A under the approved authorization, i.e., an authorization token from the service A. After that, the external service B can access the service A using this authorization token. The phrase "the user delegates an authorization to the external service B" is used to refer to a series of processes for causing an entity that will use the service, the external service B in the above-described example, to hold the authorization token as a result of execution of the authorization operation by the user. As described above, it is an entity providing a service to be used that actually delegates an authorization to an entity to use the service. In the above-described example, the service A which has confirmed that the user performed the authorization operation delegates an authorization.

It is known that this technique is utilized not only in cooperation between services but also when a resource service application in a terminal operated by a user cooperates with a service on the Internet using OAuth. Examples thereof include configurations in which a plurality of resource service applications is installed in a smart-phone that allows addition and deletion of a resource service application, and each resource service application cooperates with a service on the Internet. A representative example among them is a configuration in which a service referred to as a social networking service (hereinbelow referred to as an SNS) and a resource service application in a smart-phone cooperate with each other using OAuth.

The resource service application installed in the smart-phone accesses the SNS on behalf of the user. The user delegates an authorization for a minimum function required to use the SNS such as an authorization approving only posting of an article to the resource service application, by which the resource service application can cooperate with the SNS under the appropriate authorization without storing authentication information of the SNS in the smart-phone.

Suppose such a case that a plurality of resource service applications is installed on a smart-phone connectable with the image forming apparatus that allows installation and deletion of a resource service application and each resource service application cooperates with a cloud service. For example, a user will delegate an authorization to each resource service application with use of an authorization delegation protocol such as OAuth. In this case, the user will perform the following operation flow. The user adds a first resource service application that cooperates with a cloud service into the user's own image forming apparatus. Next, the user activates the first resource service application, and delegates an authorization for accessing the cloud service to the first resource service application by performing an authorization operation. Next, if the user adds a second resource service application, the user delegates an authorization to the second resource service application by performing an authorization operation again. In other words, the image forming apparatus requires the user to perform an authorization operation for each added resource service application for using a cloud service, leading to a cumbersome operation.

The present invention relates to an image forming apparatus for solving the above-described issue.

SUMMARY OF THE INVENTION

According to an aspect of the present invention, an image forming apparatus connectable via a network with a server and configured to provide a resource service to an external apparatus connected via the network includes a first acquisition unit configured to acquire first authorization information issued by an authorization server approving delegation of a user's authorization for using the resource service, a resource service application, and in a case a request for acquiring authorization information is received from the resource service application, a second acquisition unit configured to transmit the request further delegates the authorization to the authorization server together with the first authorization information, and acquire second authorization information issued based on the first authorization information from the authorization server.

Further features of the present invention will become apparent from the following description of exemplary embodiments with reference to the attached drawings.

BRIEF DESCRIPTION OF THE DRAWINGS

FIGS. 4A to 4C illustrate structures of tables managed by an authorization server.

FIGS. 5A to 5C illustrate structures of tables managed by an image forming apparatus.

FIG. 6 illustrates a sequence until issuance of a parent token.

FIGS. 10A to 10C illustrate a configuration of a resource service application and a structure of a table.

DESCRIPTION OF THE EMBODIMENTS

Figure 1:
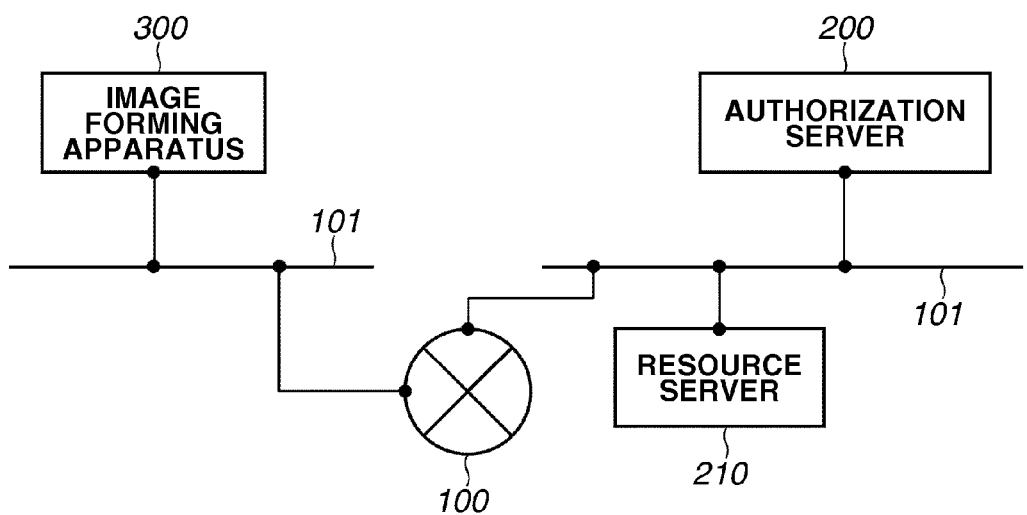
FIG. 1 illustrates a configuration of an authorization delegation system.

An exemplary embodiment of the present invention will be described assuming that a form service which generates form data on the Internet, and a print service which acquires and prints data on the Internet, are provided in servers on the Internet. According the present invention, the term "resource service" will be used herein to refer to a function provided from a network to an image forming apparatus such as the form service and the print service.

The exemplary embodiment of the present invention will be described based on an example in which the image forming apparatus as a terminal is embodied by an image forming apparatus. The present exemplary embodiment will be described assuming that a print resource service application and a form resource service application installed in the image forming apparatus use the resource services. The term "resource service resource service application" will be used herein to refer to a resource service application that uses the resource service, such as the print resource service application and the form resource service application.

Further, the OAuth mechanism is used in processing for delegating an authorization according to the exemplary embodiment of the present invention. In the OAuth mechanism, information for identifying the range of an authorization delegated by a user is expressed in a data format referred to as a token. An entity having a service to be used, i.e., a server that provides the resource service permits access from an external apparatus within the range of an authorization identified based on the token. According to the present exemplary embodiment, the term "authorization information" will be used to refer to information used to identify the range of an authorization such as the token. Further, the term "scope" will be used herein to refer to information that defines the range of an authorization delegated to an entity that uses a service, i.e., the image forming apparatus or the resource service resource service application. The term "parent token" will be used to refer to a token issued when a user delegates an authorization to the image forming apparatus. According to the present exemplary embodiment, a user's authorization is delegated to an image forming apparatus such as the image forming apparatus, which is also one of points of the exemplary embodiment of the present invention.

For example, suppose that the print resource service application and the form resource service application are provided in the image forming apparatus. According to the conventional technique, a user has to individually perform an authorization operation for the print resource service application if the user wants to use a resource service from the print resource service application, and also has to individually perform an authorization operation for the form resource service application if the user wants to use a resource service from the form resource service application. Considering from the user's perspective, it is more convenient that, if the user wants to use resource services from the same image forming apparatus, for example, performing an authorization operation only once could allow the user to use the resource services from the respective resource service applications. Therefore, according to the exemplary embodiment of the present invention, when authorizations are delegated to the resource service applications, the image forming apparatus delegates the authorizations to the resource service resource service applications on behalf of the user, thereby reducing the number of times of authorization operations that the user performs. When the user delegates an authorization to the image forming apparatus, the present exemplary embodiment assumes that the user implicitly approves delegation of the authorizations to the resource service resource service applications as well.

According to the exemplary embodiment of the present invention, the user is required to perform an authorization operation when delegating the authorization to the image forming apparatus, but the user is not required to perform an authorization operation when delegating an authorization to a resource service application. In this manner, according to the present exemplary embodiment, the user's authorization is delegated to the image forming apparatus, thereby reducing the number of times of authorization operations that the user performs compared to the conventional technique, while realizing delegation of an authorization to each resource service application that may be added in the future.

A method for delegating an authorization to a resource service application will be described now. One configuration conceivable first as the method for delegating an authorization to a resource service application may be such a configuration that resource service applications share a parent token acquired by the image forming apparatus. However, if the present exemplary embodiment employs the configuration in which the resource service applications share a parent token, this means that the completely same authorization is provided to all resource service applications, which is not favorable in the light of security.

For example, a print authorization is necessary for the print resource service application, but a form generation authorization is unnecessary for the print resource service application. Similarly, the form generation authorization is necessary for the form application, but the print authorization is unnecessary for the form application. In this manner, if individual resource service applications have respective different purposes, the respective resource service applications require different authorizations, thus it is desirable to provide required minimum authorizations to the respective resource service applications as much as possible in light of security.

Further, a server that manages tokens has a desire to keep a record indicating what kind of resource service application has accessed the server even if the server permits connection from an unexpected resource service application. This is information useful for determining a strategy for functionality enhancement of the resource service such as identifying a more frequently used resource service application to enhance the function according to scenes in which this resource service application is used. Further, a server that provides a resource service has to determine whether a resource service application that accesses the resource service with use of a token is an authorized resource service application. If not, the service may be used by an unauthorized resource service application.

According to the exemplary embodiment of the present resource service application, individual resource service cooperation resource service applications do not use a parent token directly, but, among authorizations delegated to the device, an authorization required for a resource service application is further delegated to the resource service application. Then, when the device delegates the authorization to the resource service application, the delegation is performed in such a manner that a server in charge of management of tokens can identify the resource service application. The term "child token" will be used to refer to a token issued when the image forming apparatus re-delegates an authorization to a resource service cooperation resource service application. The term "authorization cooperation" will be used to refer to an operation required for issuing both the parent token and the child token.

As a first exemplary embodiment, an exemplary embodiment especially effective for the image forming apparatus will be described. When a user delegates an authorization to a resource service application in a device owned by the user such as a smart-phone, an authorization operation is an acceptable operation since this is an operation for the resource service application that the user himself/herself added, despite a reduction in the usability. However, that is not the case with a device shared among a plurality of users, such as an image forming apparatus that allows addition and deletion of a resource service application. Normally, an administrator of the image forming apparatus adds a resource service application to the image forming apparatus. Therefore, normal users of the apparatus are not aware of using the added resource service application, but only think that they just use a function provided in the image forming apparatus. Therefore, being required to perform an authorization operation every time the user tries to use some function (actually, the added resource service application) of the image forming apparatus not only reduces the usability but also makes the user to feel annoyed with no thorough understanding of the reason therefor. Further, an authorization operation is performed for each user when an authorization is delegated. Therefore, as the number of normal users of the apparatus increases, an increasing number of authorization operations are performed on the image forming apparatus, and may lead to such a situation that the image forming apparatus is occupied thereby to prevent other users from using the image forming apparatus.

Therefore, as described above, a possible solution is to introduce a mechanism for reducing the number of times of authorization operations required for respective resource service applications, for example, allowing authorizations to be delegated to the respective resource service applications by a single authorization operation, to the image forming apparatus and the cloud service. In other words, a possible solution is a method for sharing an authorization token acquired by a single authorization operation among resource service applications in the image forming apparatus.

On the other hand, a provider of a cloud service has a desire to identify a resource service application that accesses the cloud service. Especially, a provider of a paid cloud service has a desire to limit resource service applications in access sources for the purpose of preventing unauthorized use. In order to meet this desire using OAuth, an authorization operation is performed for each resource service application.

According to the above-described method for sharing an authorization token acquired by a single authorization operation among the resource service applications in the image forming apparatus, the cloud service side cannot identify the resource service application. As the first exemplary embodiment, an exemplary embodiment for solving the relationship between these two contradicting desires will be described based on the example in which the image forming apparatus is the image forming apparatus.

An authorization delegation system according to the first exemplary embodiment is realized in a network configured as illustrated in FIG. 1. According to the present exemplary embodiment, a World Wide Web (WWW) system is established in a Wide Area Network (WAN) 100. A Local Area Network (LAN) 101 connects respective constituent elements.

An authorization server 200 is used to realize the OAuth technique, and an authorization service module is provided in the authorization server 200. A resource server 210 is connected to the LAN 101, and resource services such as a print service and a form service are provided in the resource server 210. The single resource server 210 may include a single resource service or a plurality of resource services. Further, each of the authorization server 200 and the resource server 210 may be a server group constituted by a plurality of servers, instead of being a single server. The term "authorization server system" will be used to refer to a single server or a server group constituted by a plurality of servers in which the authorization service module is provided, and mean a server group that does not include the resource server 210 and an image forming apparatus 300 that will be described below. The same applies to the term "resource server system", which refers to a single server or a plurality of servers in which the resource service is provided. If the server system is constituted by a plurality of servers, the module provided in the server system may be divided and placed across the plurality of servers so that the function is realized by cooperation of the plurality of servers, each of which includes a part of the module.

One or a plurality of resource service applications are installed in the image forming apparatus 300. A user uses these resource service applications to utilize the resource services. Further, the authorization server 200, the resource server 210, and the image forming apparatus 300 are connected with each other via the WAN 100 and the LAN 101. The authorization server 200, the resource server 210, and the image forming apparatus 300 may be provided in respective individual LANs 101, or may be provided in the same LAN 101. Further, the authorization server 200 and the resource server 210 may be provided in the same server.

Figure 2:
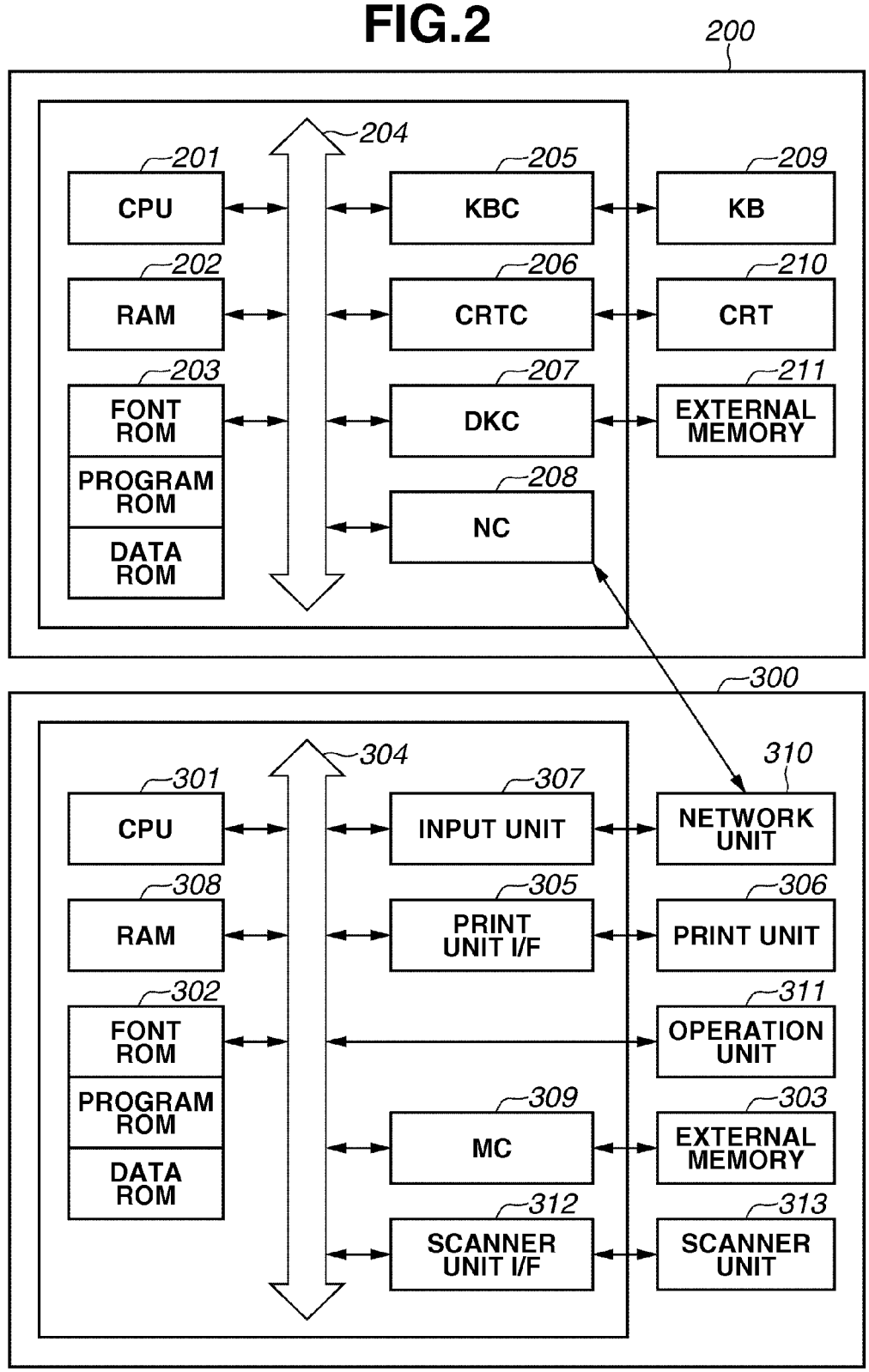
FIG. 2 illustrates a hardware configuration of each apparatus.

The authorization delegation system according to the present exemplary embodiment is realized in the system including the authorization server 200 and the image forming apparatus 300 configured as illustrated in FIG. 2. FIG. 2 illustrates the authorization server 200 and the image forming apparatus 300 communicably connected to each other via the WAN 100 and the LAN 101.

First, the configuration of the authorization server 200 will be described. The hardware block diagram illustrated in FIG. 2 corresponds to a hardware block diagram of a commonly-used information processing apparatus, and the hardware configuration of the commonly-used information processing apparatus can be applied to the authorization server 200 according to the present exemplary embodiment. The same applies to not only the authorization server 200 but also the resource server 210. Referring to FIG. 2, a central processing unit (CPU) 201 executes a program such as an operating system (OS) and a resource service application which is stored in a program read only memory (ROM) of a ROM 203 or loaded from an external memory 211 such as a hard disk (HD) to a random access memory (RAM) 202, thereby controlling each block connected to a system bus 204. The "OS" stands for an operating system that works on a computer. Herein below, an operating system will be referred to as an "OS". The processing of each sequence that will be described below can be realized by execution of the program. The RAM 202 functions as a main memory, a work memory, and the like of the CPU 201.

A keyboard controller (KBC) 205 controls a key input from a keyboard 209 and a not-illustrated pointing device. A cathode-ray tube controller (CRTC) 206 controls a display of a CRT display 210. A disk controller (DKC) 207 controls access to data in the external memory 211 that stores various pieces of data, such as a hard disk (HD). A network controller (NC) 208 performs communication control processing between the authorization server 200, and the image forming apparatus 300 and another device connected via the WAN 100 or the LAN 101. In all of descriptions that will be described below, the CPU 201 serves as an entity of execution in the authorization server 200 in terms of hardware, and the resource service application program installed in the external memory 211 serves as an entity of execution in terms of software, unless otherwise indicated.

Next, the configuration of the image forming apparatus 300 will be described. As illustrated in FIG. 2, the image forming apparatus 300 includes a CPU 301 which controls each block connected to a system bus 304 based on a control program stored in a ROM 302 or an external memory 303. An image signal generated from processing by the CPU 301 is output to a print unit (an image forming apparatus engine) 306 via a print unit interface (I/F) 305 as output information. The image forming apparatus 300 may include a scanner unit (not illustrated) for reading a document, and the image forming apparatus 300 includes at least one image processing unit of the print unit and the scanner unit. The CPU 301 can communicate with the authorization server 200 via an input unit 307 and a network unit 310, and can notify the authorization server 200 of, for example, information in the image forming apparatus 300.

The control program of the CPU 301 and the like are stored in a program ROM in the ROM 302. Font data used in generation of output information, and the like are stored in a font ROM in the ROM 302. Information to be transmitted to or received from the authorization server 200, and the like are stored in a data ROM in the ROM 302, if the image forming apparatus 300 does not include the external memory 303 such as a hard disk.

A RAM 308 is a RAM that functions as a main memory, a work memory, and the like of the CPU 301, and is configured to be able to increase the memory capacity by an optional RAM connected to a not-illustrated expansion port. The RAM 308 is also used as an output information development area, an environmental data storage area, a non-volatile random access memory (NVRAM), and the like.

Access to the external memory 303 is controlled by a memory controller (MC) 309. The external memory 303 is connected optionally, and stores font data, an emulation program, form data, and the like. An operation unit 311 includes a switch for an operation, a light emitting diode (LED) display, and the like. In all of descriptions that will be described below, the CPU 301 serves as an entity of execution in the image forming apparatus 300 in terms of hardware, and the resource service application program installed in the external memory 303 serves as an entity of execution in terms of software, unless otherwise indicated.

Figure 3:
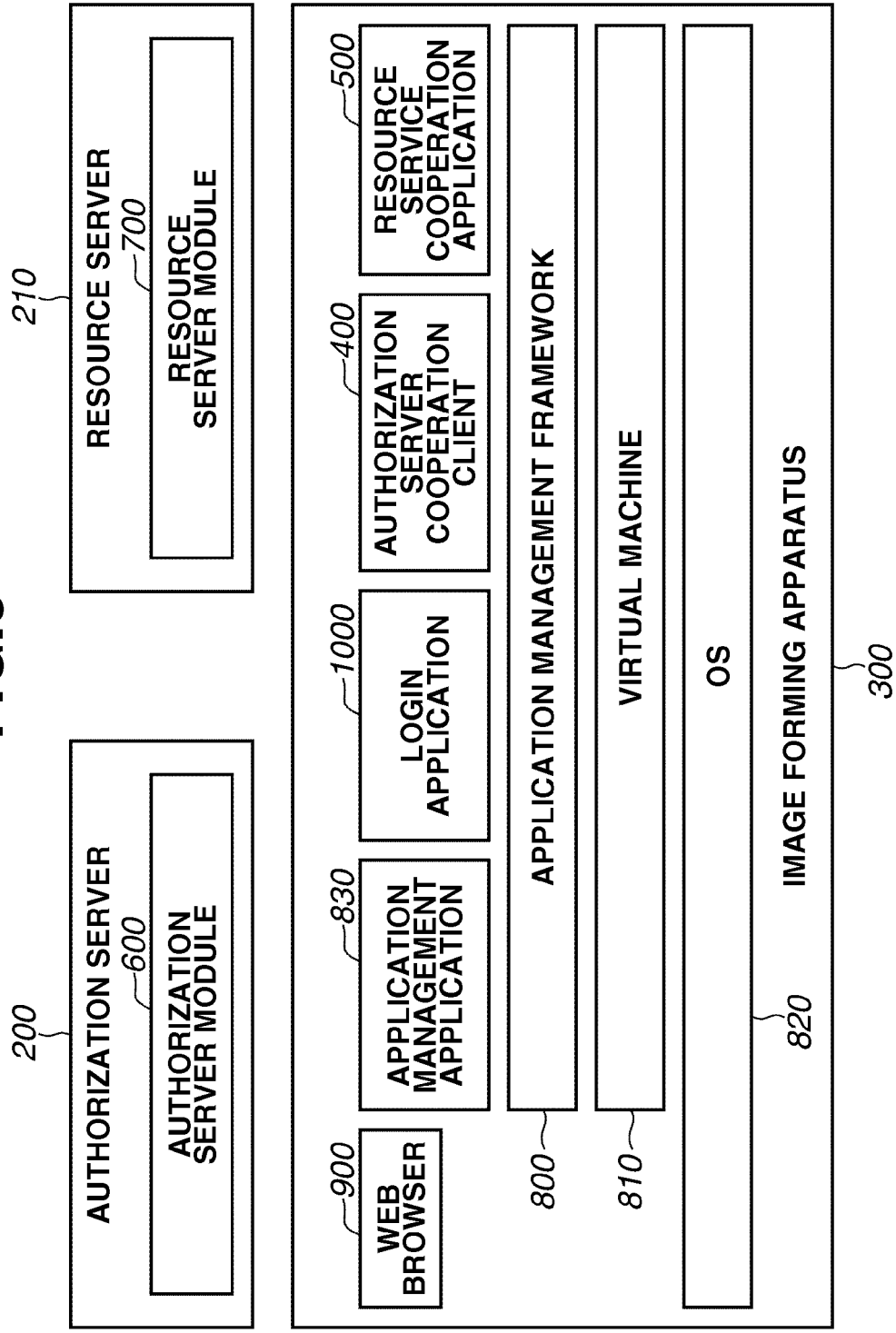
FIG. 3 illustrates a configuration of software modules in each apparatus.

FIG. 3 illustrates the respective module configurations of the authorization server 200, the resource server 210, and the image forming apparatus 300 according to the present exemplary embodiment. Any of the modules illustrated in FIG. 3 is a module realized by the CPU 201 or 301 of each apparatus illustrated in FIG. 2 executing the resource service application program installed in the external memory 211 or 303 with use of the RAM 202 or 308. The authorization server 200 includes an authorization server module 600, and the resource server 210 includes a resource server module 700.

FIG. 3 also illustrates the image forming apparatus 300. In the image forming apparatus 300, the CPU 301 executes an OS 820 stored in the ROM 302 or the external memory 303, thereby controlling the respective resource service applications. Generally, a real-time OS is employed as the OS 820, however sometimes a general-purpose OS such as Linux (registered trademark) is employed as the OS 820 nowadays. The image forming apparatus 300 further includes a virtual machine 810. For example, Java (registered trademark) vertical machine (VM) is well known as a virtual machine. The virtual machine 810 is a virtual resource service application execution environment that operates as a resource service application controlled by the OS 820. The image forming apparatus 300 further includes a resource service application management framework 800. The resource service application management framework 800 has a function of managing a life cycle of a management target resource service application that operates in the resource service application execution environment provided by the virtual machine 810, an IF for controlling the management function, and an I/F publication function of transferring a processing request among the respective resource service applications. The term "life cycle" is used to mean a status of a resource service application including installation, start, stop, and uninstallation of a resource service application. The present exemplary embodiment will be described assuming that the resource service application management framework 800 is realized by Open Services Gateway initiative (OSGi) (registered trademark) formulated by OSGi Alliance.

Various types of resource service applications, such as an authorization server cooperation client 400, one or a plurality of resource service applications 500, and a login resource service application 1000, operate in the resource service application execution environment provided by the virtual machine 810. The life cycles of these resource service applications are managed by the resource service application management framework 800. The resource service application management framework 800 manages each resource service application based on a definition value described in a resource service application definition file 1901, which will be described below. For example, the resource service application management framework 800 manages each resource service application while associating a resource service application identification (ID) uniquely assigned to the resource service application with the entity of the installed or started resource service application. The resource service application ID is identification information for identifying the resource service application, and unique information for each resource service application or common information among resource service applications belonging to a specific group. A resource service application management resource service application 830 receives and executes a request for installation and start of various types of resource service applications from a user via a control I/F for life cycle management which is published by the resource service application management framework 800.

The authorization server cooperation client 400, the resource service cooperation resource service application 500, and the login resource service application 1000 may be provided in the image forming apparatus 300 as default, or may be installed in the image forming apparatus 300 later via the resource service application management resource service application 830 and the resource service application management framework 800. The image forming apparatus 300 also includes a Web browser 900, which is a user agent allowing a user to use the WWW. A sequence for installing a resource service application and a sequence for starting a resource service application in the resource service application management framework 800 will be described below.

FIGS. 4A, 4B, and 4C illustrate data tables that the authorization server 200 stores in the external memory 211. The authorization delegation system may be configured to store these data tables in another server which is communicable thereto via the LAN 101, instead of storing them in the external memory 211 of the authorization server 200. FIG. 4A illustrates a user management table 1200. The user management table 1200 includes a user ID 1201, a password 1202, and a user type 1203. The authorization server 200 has a function of authenticating each user or each client by verifying a pair of information pieces of the user ID 1201 and the password 1202 and generating authentication information if they are valid. The term "authentication processing" is used to refer to processing for verifying a pair of information pieces of the user ID 1201 and the password 1202 by the authorization server 200.

FIG. 4B illustrates a client management table 1300. The client management table 1300 includes a client ID 1301, a client name 1302, a redirection Uniform Resource Locator (URL) 1303, and a serial number 1304. The client ID 1301 is associated with the user ID 1201 in the user management table 1200, and the client ID 1301 and the user ID 1201 are referable from each other. The client name 1302 and the redirection URL 1303 are values used in an OAuth sequence, which will be described below. The serial number 1304 is a value registered if a client is provided in the image forming apparatus 300, and is a value allowing unique identification of the image forming apparatus 300.

FIG. 4C illustrates an authorization token management table 1400. The authorization token management table 1400 includes an authorization token ID 1401, a token type 1402, an expiration date 1403, a scope 1404, a refreshing token ID 1405, a refreshing expiration date 1406, a client ID 1407, a user ID 1408, and a resource service application ID 1409. A processing relating to these items in the authorization token management table 1400 will be described in detail below.

FIGS. 5A, 5B, and 5C illustrate data tables that the image forming apparatus 300 stores in the external memory 303. FIG. 5A illustrates a device user management table 1500. The device user management table 1500 is configured so as to be referable and updatable from the login resource service application 1000. According to the present exemplary embodiment, the device user management table 1500 is described to be stored in the external memory 303 of the image forming apparatus 300. However, the device user management table 1500 may be stored in another server with which the image forming apparatus 300 can communicate via the LAN 101. The device user management table 1500 includes a user ID 1501, a password 1502, and integrated circuit (IC) card information 1503. The login resource service application 1000 has the following functions. The login resource service application 1000 forms a screen (not illustrated) for receiving a user ID and a password from a user with use of an input screen of the image forming apparatus 300. Then, the login resource service application 1000 authenticates each user by verifying a pair of the input user ID and password to determine whether the pair matches a pair of the user ID 1501 and the password 1502, and generating a login context containing the information of the user ID 1501 if the input pair matches a pair in the data table. Further, the login resource service application 1000 also has the following functions. The login resource service application 1000 acquires IC card information from a not-illustrated IC card reader connected to the image forming apparatus 300, and verifies the acquired IC card information to determine whether it matches information of the IC card information 1503. The login resource service application 1000 authenticates each user by generating a login context containing the information of the user ID 1501 if the acquired IC card information matches the IC card information 1503.

The login context is an object to which the information of the user ID 1501 of an authenticated user is set, and can be also configured in such a manner that user's attribute information such as a domain to which the user belongs and a user's electronic mail address is set thereto in addition to the user ID 1501. While the user remains logged in the image forming apparatus 300, the image forming apparatus 300 holds the login context. The login context is used to enable secure access when an internal program module uses a resource of the image forming apparatus 300.

FIG. 5B illustrates a device management table 1600. The device management table 1600 is configured so as to be referable and updatable only from the authorization server cooperation client 400. The device management table 1600 includes a client ID 1601, a client secret 1602, an endpoint URL 1603, and a redirection URL 1604. The client ID 1601 and the client secret 1602 respectively correspond to the user ID 1201 and the password 1202 for a client which are issued by and stored in the authorization server 200 in advance. Data stored in the redirection URL 1604 is the same as the information registered in the client management table 1300 in the authorization server 200 together with the client ID 1301, the client name 1302, and the serial number 1304 of the image forming apparatus 300. As a method for registering these information pieces into the authorization server 200, for example, the image forming apparatus 300 may register them via the LAN 101 and the WAN 100 online, or a serviceperson may set values respectively to the authorization server 200 and the image forming apparatus 300. The endpoint URL 1603 is a URL of an endpoint for OAuth, which is published by the authorization server 200.

FIG. 5C illustrates a parent token management table 1700. The parent token management table 1700 is configured so as to be referable and updatable only from the authorization server cooperation client 400. The parent token management table 1700 includes a user ID 1701, an authorization token ID 1702, and a refreshing token ID 1703. Processing relating to the parent token management table 1700 will be described in detail below.

A sequence for acquiring a parent token according to the present exemplary embodiment will be described with reference to FIGS. 6 and 7A to 7C. The sequence is an operation performed only once when a user uses the image forming apparatus 300 for the first time. The flow illustrated in FIG. 6 can be performed, for example, when a user uses the image forming apparatus 300 for the first time after the authorization server cooperation client 400 is installed in the image forming apparatus 300. First, in step S1.1, the user logs in the image forming apparatus 300 using a login method provided by the login resource service application 1000 in the image forming apparatus 300. At this time, suppose that a user having a user ID of "user001" logs in the image forming apparatus 300. Then, in step S1.2, the login resource service application 1000 generates a login context containing the user ID "user001", and stores the login context in the RAM 308 in such a manner that the respective resource service applications can acquire the login context via the resource service application management framework 800.

Figure 7A:
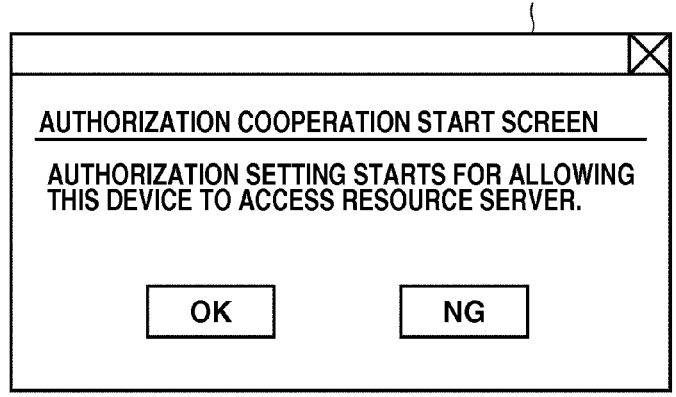
FIGS. 7A to 7C illustrate screens relating to authorization processing.

Next, in step S1.3, the user executes the browser 900 by operating the image forming apparatus 300. The user may use a browser in an external apparatus for access, instead of the image forming apparatus 300. Then, the user accesses a URL of the authorization server cooperation client 400 for starting authorization cooperation with use of the browser 900. The authorization server cooperation client 400 may be configured to transmit a screen 1801 for a user to confirm a start of authorization cooperation as illustrated in FIG. 7A in return at this time. In step S1.4, upon reception of a start of authorization cooperation, the authorization server cooperation client 400 requests redirection to the browser 900 in such a manner that the browser 900 issues an OAuth authorization request to the URL written in the endpoint URL 1603 in the device management table 1600. This authorization request contains the information of the client ID 1601 and the redirection URL 1604 in the device management table 1600. According to OAuth, the authorization request can be also configured so as to contain a scope which indicates an authorization coverage on which the user wants to exert authorization. The present exemplary embodiment is described assuming that a scope A is requested as the scope.

Figure 7B:
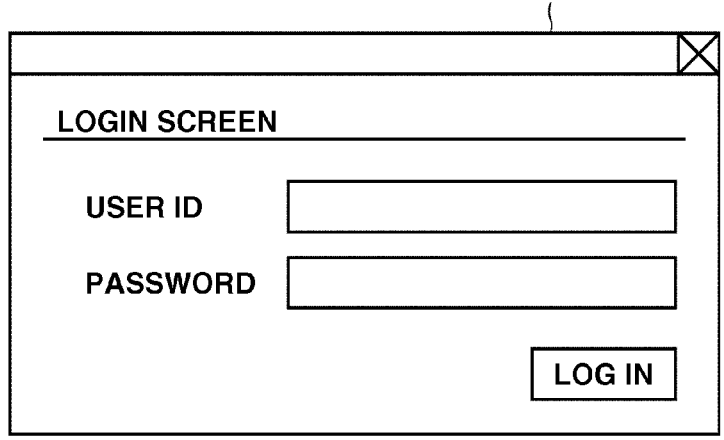
Figure 7C:
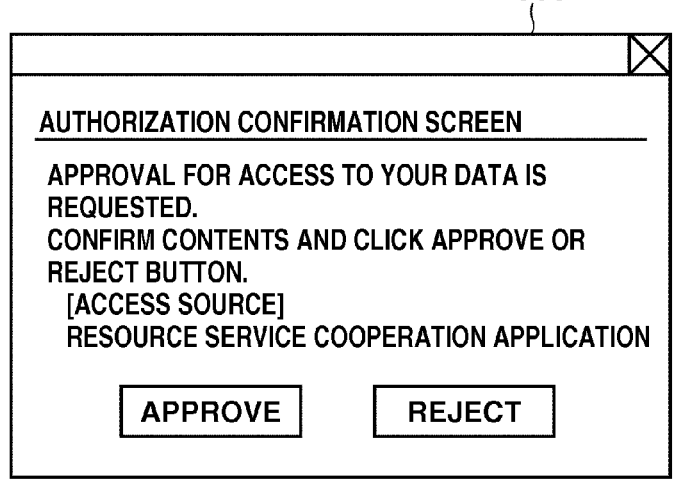

In step S1.5, upon reception of the authorization request, the authorization server 200 transmits a login screen 1802 illustrated in FIG. 7B to authenticate the user to the browser 900 in return. In step S1.6, the user logs in the authorization server 200 by inputting a user ID and a password on the login screen 1802 displayed on the browser 900. The authorization server 200 verifies the pair of the received user ID and password to determine whether the received pair matches the information registered in the user management table 1200. If the received pair matches the information registered in the user management table 1200, the authorization server 200 generates authentication information associated with the user ID, and performs the following processing. The authorization server 200 verifies the pair of the client ID and the redirection URL contained in the authorization request to determine whether this pair matches the information registered in the client management table 1300. If a result of the verification indicates a match, in step S1.7, the authorization server 200 acquires the client name 1302 in the client management table 1300, and generates an authorization confirmation screen 1803 illustrated in FIG. 7C to transmit the screen to the browser 900 in return. At this time, the authorization server 200 transmits the screen in return while storing the authentication information in the browser 900 as Cookie information. The present exemplary embodiment is described assuming that the client name 1302 is displayed on the authorization confirmation screen 1803. However, the screen can be configured in such a manner that a detailed description of the client is additionally displayed thereon, and information of the logged-in user is displayed thereon. Further, if a scope is contained in the authorization request, the authorization confirmation screen 1803 can be also configured in such a manner that information describing the scope range is displayed thereon. By this processing, the authorization server 200 completes both authentication of the user and authentication of the authorization server cooperation client 400.

Next, in step S1.8, the user performs an authorization operation for an approval on the authorization confirmation screen 1803 displayed on the browser 900. Upon reception of the approval, the authorization server 200 performs the following processing. The authorization server 200 issues an authorization code and registers the code in the authorization token management table 1400. At this time, the authorization server 200 respectively registers an ID of the issued token, the authorization code, and an expiration date of the issued token in the authorization token ID 1401, the token type 1402, and the expiration date 1403. Further, the authorization server 200 registers the client ID received at the time of the authorization request in the client ID 1407, and registers the user ID associated with the authentication information transmitted from the browser 900 as Cookie in the user ID 1408. Then, in step S1.9, the browser 900 is requested to be redirected to the redirection URL to which the authorization token ID of the authorization code added as an authorization reply.

In step S1.10, upon reception of the authorization reply, the authorization server cooperation client 400 issues a token request to the authorization server 200. The token request contains the authorization token ID of the authorization code acquired from the authorization reply, and the client ID 1601, the client secret 1602, and the redirection URL 1604 in the device management table 1600. In step S1.11, upon reception of the token request, the authorization server 200 verifies the following information pieces, and generates a parent token if all of the information pieces are valid. The authorization server 200 verifies the pair of the client ID and the client secret received as the token request to determine whether this pair matches the pair of the user ID 1201 and the password 1202 registered in the user management table 1200. Next, the authorization server 200 verifies the authorization token ID of the authorization code received as the token request to determine whether this ID is registered in the authorization token management table 1400 and the expiration date thereof has not passed yet. Then, the authorization server 200 verifies the client ID and the redirection URL received as the token request to determine whether they match the client ID 1407 identified from the authorization token ID in the authorization token management table 1400 and the redirection URL 1303 in the client management table 1300, respectively.

Alternatively, the authorization server 200 can be configured in such a manner that the redirection URL 1303 is not registered in the client management table 1300, but a column is added to the authorization token management table 1400 so that the redirection URL 1303 is registered when the authorization code is issued and the authorization server 200 compares the received redirection URL with the added column. If the authorization serve 200 can verify that all of these information pieces are valid, in step S1.12, the authorization server 200 generates a parent token, and transmits the authorization token ID of the parent token to the authorization server cooperation client 400 in return. At this time, the returned content also contains a refreshing token ID issued at the same time as the parent token. In association with the parent token, the issued token ID, the type "PARENT TOKEN", the expiration date are respectively registered in the authorization token ID 1401, the token type 1402, and the expiration date 1403. Further, the client ID and the user ID are also registered in the client ID 1407 and the user ID 1408 as information inherited from the authorization code. At this time, a refreshing token for refreshing the parent token is issued, and the ID and expiration date of the refreshing token are registered in the refreshing token ID 1405 and the refreshing expiration date 1406. A flow of processing for refreshing a parent token will be described below. In the present disclosure, the term "reissue information" will be used to refer to information required to reissue authorization information, like the refreshing token.

In step S1.13, upon acquisition of the authorization token ID and the refreshing token ID of the parent token, the authorization server cooperation client 400 acquires the login context of the user logged in the image forming apparatus 300 via the resource service application management framework 800. Then, in step S1.14, the authorization server cooperation client 400 acquires the device user ID from the login context, and stores the device user ID, and the authorization token ID and the refreshing token ID of the parent token in the parent token management table 1700. Then, in step S1.15, the authorization server cooperation client 400 transmits a not-illustrated screen for indicating completion of the authorization cooperation to the browser 900 in return, and ends the processing. This is the configuration and the flow for delegating an authorization to an image forming apparatus by performing an authorization operation for approving delegation of the user's authorization for using a service to the image forming apparatus 300. The image forming apparatus 300 to which the user's authorization is delegated in turns delegates the authorization to each resource service application 500 on behalf of the user.

Figure 8B:
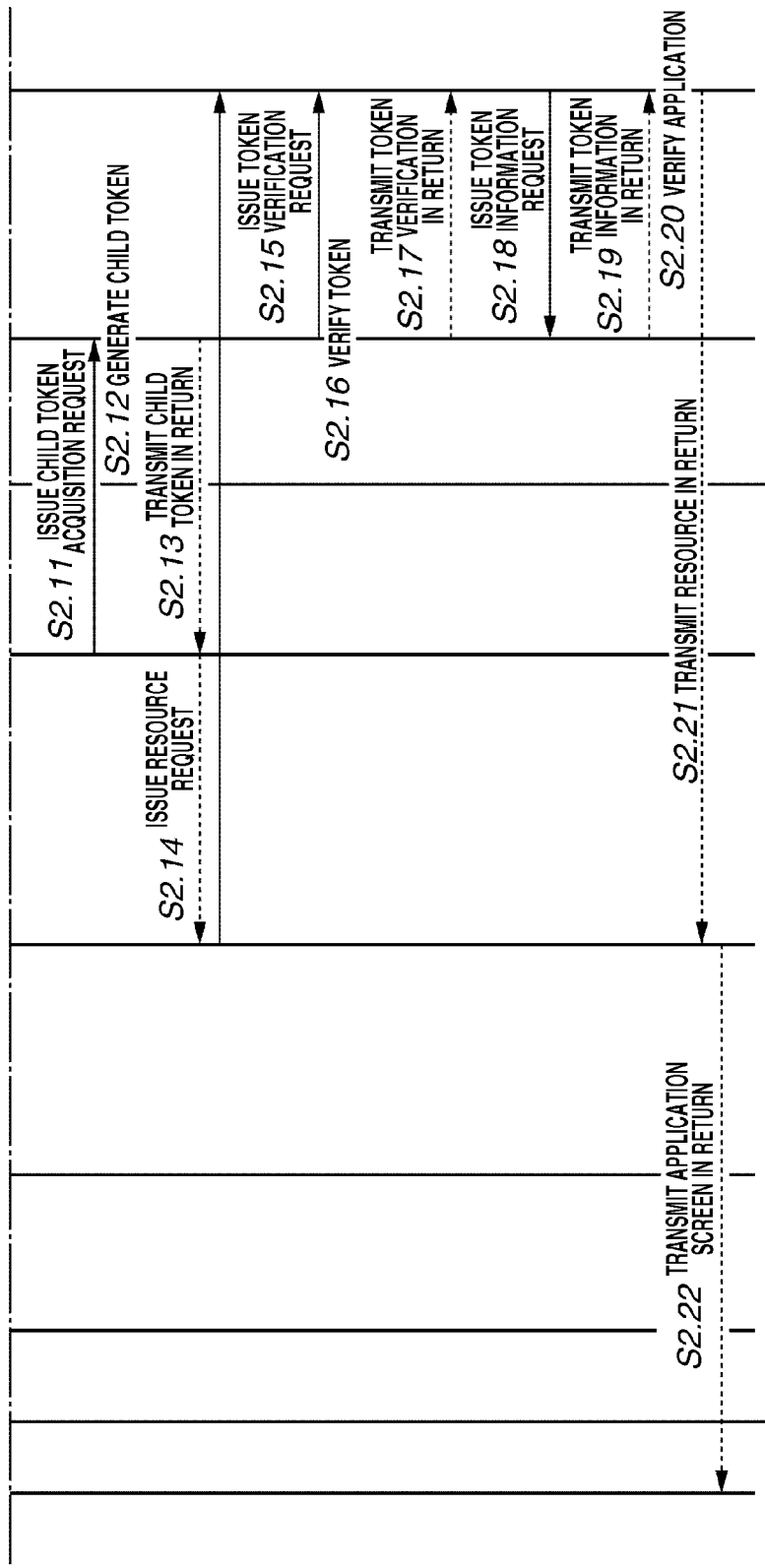
FIG. 8 (including FIGS. 8A and 8B) illustrates a sequence until issuance of a child token.

Subsequently, a sequence according to which the image forming apparatus 300 delegates the authorization to a resource service application on behalf of the user after the user's authorization is delegated to the image forming apparatus 300 will be described with reference to FIG. 8 (including FIGS. 8A and 8B). The sequence is a sequence performed when a user executes the resource service application 500 provided in the image forming apparatus 300. The sequence for acquiring the parent token should be performed before the present sequence. First, in step S2.1, a user logs in the image forming apparatus 300 using the login method provided by the login resource service application 1000 in the image forming apparatus 300. At this time, suppose that a user having a user ID of "user001" logs in the image forming apparatus 300. Then, in step S2.2, the login resource service application 1000 generates a login context containing the user ID "user001", and stores the login context in the RAM 308 in such a manner that the respective resource service applications 500 can acquire this login context via the resource service application management framework 800. If the present sequence is performed continuously after the sequence for acquiring the parent token, the user does not have to log in the image forming apparatus 300 again, and the present sequence is performed as an operation sequence starting from a next step, step S2.3.

Next, in step S2.3, the user accesses a resource service application screen (not illustrated) of the resource service application 500 by operating the image forming apparatus 300. This resource service application screen is, for example, a screen allowing the user to select a document to be printed if the resource service cooperation application 500 is the print application, or a screen allowing the user to select a form to be created if the resource service application 500 is the form application. Accessing a resource service application screen means that, for example, icons of respective resource service applications 500 set in a start ready state in the resource service application management framework 800 are displayed on an operation panel provided to the image forming apparatus 300, and the user selects the icon of the resource service application 500 to be started among the icons.

In step S2.4, the resource service application 500 of which resource service application screen is accessed by the user acquires the login context from the resource service application management framework 800. Then, in step S2.5, the resource service application 500 issues a token acquisition request to a token acquisition interface of the authorization server cooperation client 400 registered in the resource service application management framework 800. At this time, the resource service application 500 adds the acquired login context to the request. The resource service application 500 can be also configured so as to request a scope required for the token at this time. The present exemplary embodiment is described assuming that the scope A is requested continuously. In step S2.6, upon reception of the token acquisition request, the authorization server cooperation client 400 acquires the resource service application ID of the resource service application 500, which is the request source, via the resource service application management framework 800. A sequence for acquiring a resource service application ID will be described below.

Upon acquisition of the resource service application ID, the authorization server cooperation client 400 performs the following processing. First, the authorization server cooperation client 400 verifies the acquired login context via the resource service application management framework 800 to determine whether the context is valid. If the acquired login context is valid, the authorization server cooperation client 400 acquires the device user ID associated with the login context. The present exemplary embodiment is described assuming that the authorization server cooperation client 400 verifies the login context. However, the authorization delegation system can be also configured in such a manner that only the resource service application management framework 800 can generate an instance of a login context, and the login context is verified as valid according to the fact that the instance is generated. Next, the authorization server cooperation client 400 acquires the refreshing token ID from the parent token management table 1700 using the acquired device user ID as a key. At this time, the authorization server cooperation client 400 can be also configured so as to provide a screen (not illustrated) for prompting the user to perform the parent token acquisition sequence if the user ID is not registered in the parent token management table 1700. Alternatively, in some cases, the authorization server cooperation client 400 may be configured so as to activate the browser 900 and automatically start the parent token acquisition sequence.

In step S2.7, the authorization server cooperation client 400 issues a token refreshing request to the authorization server 200 using the acquired refreshing token ID, and the client ID and the client secret in the device management table 1600. The present example is described assuming that some time has elapsed from execution of the parent token acquisition sequence to the child token acquisition sequence, and the parent token has expired. However, if the parent token has not expired yet, the authorization server cooperation client 400 may issue a child token acquisition request in step S2.11 without issuing the token refreshing request.

Upon receiving the token refreshing request, the authorization server 200 performs the following processing. First, the authorization server 200 verifies the pair of the client ID and the client secret contained in the token refreshing request to determine whether this pair matches a pair of the user ID 1201 and the password 1202 in the user management table

1200. If the received pair matches a pair in the user management table 1200, the authorization server 200 confirms whether the refreshing token ID contained in the token refreshing request is registered in the authorization token management table 1400 and the refreshing expiration date thereof has not passed yet. Further, the authorization server 200 verifies the client ID contained in the token refreshing request to determine whether this client ID matches the client ID 1407. If all of the information pieces are verified as valid, in step S2.9, the authorization server 200 refreshes the parent token (reissues the parent token), and transmits the authorization ID of the refreshed parent token and the refreshing token ID to the authorization server cooperation client 400 in return. As a refreshing method, the authorization server 200 newly issues an authorization token ID and a refreshing token ID, and registers them in the authorization token management table 1400. At this time, data is inherited from the token type 1402, the scope 1404, the client ID 1407, and the user ID 1408 of the record identified based on the refreshing token ID received as the token refreshing request. Further, after the inheritance, the authorization server 200 invalidates the original refreshing token ID so that the original refreshing token ID cannot be refreshed again. Alternatively, the authorization server 200 can be also configured so as to forcibly terminate the expiration date of the refreshing token, or to inherit the original refreshing token ID without newly issuing a refreshing token ID.

In step S2.10, upon acquisition of the refreshed parent token, the authorization server cooperation client 400 registers the received authorization token ID and refreshing token ID again by overwriting the information in the parent token management table 1700 with them. Then, in step S2.11, the authorization server cooperation client 400 issues a child token acquisition request to the authorization server 200 using the authorization token ID of the parent token, the client ID and the client secret in the device management table 1600, the scope received as the token acquisition request, and the acquired resource service application ID. The resource service application ID contained in the child token acquisition request cannot be altered by the resource service application 500, as will be described below. The child token acquisition request is equivalent to a request for further delegating the authorization delegated from the user to the above-described resource service application 500.

Upon reception of the child token acquisition request, the authorization server 200 performs the following processing. First, the authorization server 200 verifies the pair of the client ID and the client secret contained in the child token acquisition request to determine whether this pair matches a pair of the user ID 1201 and the password 1202 in the user management table 1200. If the received pair matches a pair in the user management table 1200, the authorization server 200 confirms whether the authorization token ID contained in the child token acquisition request is registered in the authorization token management table 1400 and the expiration date thereof has not passed yet. Further, the authorization server 200 verifies the client ID contained in the child token acquisition request to determine whether this client ID matches the client ID 1407. If all information pieces are verified as valid, in step S2.13, the authorization server 200 generates a child token, and transmits the child token to the authorization server cooperation client 400 in return.

At this time, the authorization server 200 issues an authorization token ID for the child token, and registers the child token in the authorization token management table 1400 while storing the type "CHILD TOKEN" in the token type 1402, the acquired application ID in the application ID 1409, and the scope contained in the child token acquisition request in the scope 1404 in association with the issued child token. At this time, the client ID 1407 and the user ID 1408 of the record identified based on the authorization token ID received as the child token acquisition request are inherited. Further, as a result of the inheritance, the application ID is associated with the child token, so that the authorization server 200 can identify the application ID from the child token. As a result, the user ID for identifying the user, the client ID for identifying the image forming apparatus 300, and the application ID for identifying the application are associated with the child token issued at this time. The authorization server 200 does not issue a refreshing token for a child token. This is because the client ID and the client secret are necessary for issuing a token refreshing request, and therefore each resource service application 500 using a child token cannot issue a refreshing request. In addition, another reason is to eliminate such a security risk that each resource service application 500 may leak a refreshing token to allow the expiration date of the token to be freely updated.

Then, upon acquisition of the authorization token ID of the child token, the authorization server cooperation client 400 transmits the authorization token ID of the child token in return to the resource service cooperation resource service application 500 that is the request source. In step S2.14, upon acquisition of the authorization token ID of the child token, the resource service application 500 issues a resource request that contains the authorization token ID to the resource server 210. In step S2.15, upon reception of the resource request, the resource server 210 requests the authorization server 200 to verify the authorization token ID of the child token contained in the resource request. The scope can be contained in this token verification request. In step S2.16, upon reception of the token verification request, the authorization server 200 verifies the received authorization token ID to determine whether the authorization token ID is registered in the authorization token management table 1400, the expiration date thereof has not passed yet, and the received scope is within the range of the score 1404. Then, in step S2.17, the authorization server 200 transmits the verification result to the resource server 210 in return.

Next, in step S2.18, upon determining that the access by the resource service application 500 is authorized access as a result of the verification, the resource server 210 issues a request for acquiring token information of the authorization token ID of the child token to the authorization server 200. In step S2.19, upon reception of the token information acquisition request, the authorization server 200 acquires the information identified based on the received authorization token ID from the authorization token management table 1400, and transmits the acquired information to the resource server 210 in return. This return contains, for example, the information of the scope 1404, the client ID 1407, the user ID 1408, and the resource service application ID 1409. The return can be also configured to further contain the serial number 1304 registered in the client management table 1300, which is identified based on the client ID 1407.

In step S2.20, upon acquisition of the token information, the resource server 210 determines whether to permit or prohibit access to the resource for which the request is received based on the acquired information. More specifically, a resource service application ID permitted to access the resource is set to the resource server 210 in advance, and the resource server 210 verifies whether to permit or prohibit access by comparing the set resource service application ID and the resource service application ID acquired from the token information of the child token. If the resource server 210 determines that the access will be permitted as a result of the verification, in step S2.21, the resource server 210 transmits the resource to the resource service cooperation resource service application 500 in return. The resource is, for example, a list of printable documents if the resource server 210 is the print service, or a list of creatable forms if the resource server 210 is the form service. The resource server 210 acquires a resource service application ID from a distribution server that distributes the resource service cooperation resource service application 500 to the image forming apparatus 300, so that the resource service application ID can be set to the resource server 210 in advance. Alternatively, an administrator of the resource server 210 may set the resource service application ID manually in response to a request from a developer who has developed the resource service cooperation resource service application 500.

The present exemplary embodiment is described based on the example in which the verification of the token from step S2.15 to step S2.20 is performed by the authorization server 200 and the resource server 210, respectively. However, the authorization delegation system can be also configured in such a manner that the authorization server 200 manages resource service applications 500 permitted to access the resource, and the authorization server 200 is in charge of all of the verification operations. Further, the present exemplary embodiment is described based on the example in which whether the resource service application 500 is permitted to access the resource is determined using the resource service application ID. However, the authorization delegation system can be also configured in such a manner that the image forming apparatus 300 is identified based on the serial number and the client ID that can be acquired from the token information, and whether access is permitted is determined therefrom. Further, similarly, the authorization delegation system can be also configured in such a manner that whether access is permitted is determined based on the scope and the user ID that can be acquired from the token information. In step S2.22, upon reception of the resource reply, the resource service cooperation resource service application 500 constructs the above-described resource service application screen based on the received data, and provides the screen to the user in return.

These sequences for acquiring the parent token and child token reduce the number of times of authorization operations that the user performs to only once, and allow the resource server 210 to identify a resource service application 500 that requests access. Further, the resource server 210 can also recognize that the access is an access from the resource service cooperation resource service application 500 that has acquired a child token in an authorized manner.

The method that the resource service cooperation resource service application 500 issues a token acquisition request to the authorization server cooperation client 400, and the method that the authorization server cooperation client 400 acquires the resource service application ID of the request source are described next.

FIG. 10A illustrates a configuration of a resource service application file of a resource service application 500 to be installed. An application file 1900 includes the application definition file 1901 and an application 1902 which is the entity of the resource service application. The application file 1900 is encrypted with the application definition file 1901 and the application 1902 contained therein. A key for decrypting the application file 1900 is written in a license file 1910. The resource service application ID for uniquely identifying the resource service application, a version of the resource service application, and a resource service application name are written in the application definition file 1901. In addition thereto, a definition about a resource amount such as a storage area consumed by the resource service application 500, a class path of a class executed when the resource service application starts, and the like are written in the application definition file 1901.

FIG. 10B illustrates a configuration of the license file 1910 required when the resource service application is installed. The license file 1910 includes an application decryption key 1911 for decrypting the application file 1900. The license file 1910 is encrypted by a public key so as to be able to be decrypted by a private key stored in the application management application 830. According to these configurations, the application definition file 1901 and the application 1902 are protected so as to be unable to be altered, as long as the private key stored in the application management application 830 is not leaked.

FIG. 10C illustrates an application management table 1920 managed by the resource service application management framework 800. The application management table 1920 includes a resource service application ID 1921, a version 1922, an application name 1923, a storage location 1924, and a status 1925.

The resource service application management framework 800 manages resource service application objects, which are respective resource service applications executed and developed in the RAM 308, in the form of a list. The respective resource service application objects registered in the list are associated with the information in the resource service application management table 1920 based on the resource service application ID, and are configured so as to allow reference therefrom to the information in the resource service application management table 1920. The list of the resource service application objects is configured so as to be able to be acquired by the resource service application management resource service application 830 via the I/F of the resource service application management framework 800.

Figure 9:
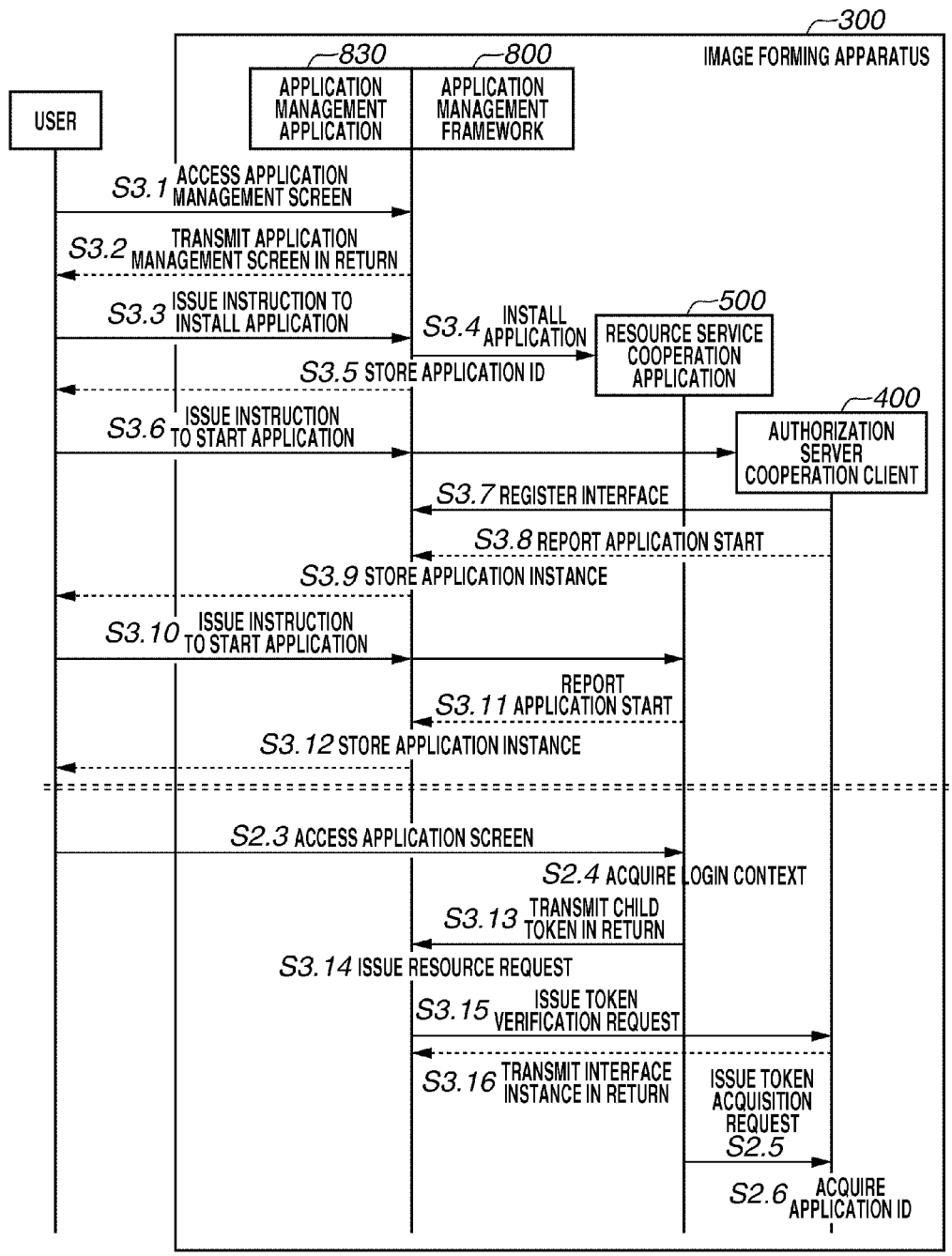
FIG. 9 illustrates a sequence for managing a resource service application.

Next, a sequence for installing a resource service application into the image forming apparatus 300, and a sequence for starting each resource service application will be described with reference to FIG. 9. In the following description, processing similar to that in the sequence described with reference to FIG. 8 will be identified by the same sequence number, and will not be described repeatedly. First, the sequence for installing a resource service application will be described. In step S3.1, a user accesses a resource service application management screen (not illustrated) provided to the resource service application management resource service application 830 in the image forming apparatus 300 with use of a Web browser provided in a not-illustrated personal computer (PC). In step S3.2, the resource service application management resource service application 830 transmits the resource service application management screen in return. The authorization delegation system can be also configured in such a manner that, at this time, a not-illustrated login screen is displayed as authentication of access to the resource service application management resource service application 830, and authentication is carried out.

Next, in step S3.3, the user uploads the application file 1900 and the license file 1910 to be installed on the application management screen, and instructs the resource service application management resource service application 830 to install the resource service application. The present exemplary embodiment is described assuming that the print application is uploaded as the resource service application 500 is uploaded as the resource service application. Upon reception of the application file 1900 and the license file 1910, the resource service application management resource service application 830 performs the following processing. The resource service application management resource service application 830 decrypts the license file 1910 with use of a private key stored in the resource service application management resource service application 830. After succeeding in the decryption, the resource service application management resource service application 830 acquires the resource service application decryption key 1911 from the license file 1910. Next, the resource service application management resource service application 830 decrypts the received resource service application file 1900 with use of the resource service application decryption key 1911. The resource service application management resource service application 830 acquires the resource service application definition file 1901 from the decrypted resource service application file, and interprets the defined content thereof. It is possible to determine that the content written in the resource service application definition file 1901 is valid based on the fact that the application file 1900 can be decrypted with use of the application decryption key 1911, and further, the application definition file 1901 can be interpreted.

The application file 1900 can be also configured so as to include the application definition file 1901 and a file in which a signature value of the resource service application 1902 is described. In this case, it is also possible to further securely ensure that the resource service application ID is not altered by verifying the signature value after decrypting the application file 1900 with use of the application decryption key 1911. If the application file 1900 cannot be decrypted with use of the application decryption key 1911, and/or the signature value is invalid, the resource service application may be altered, so that the resource service application management resource service application 830 refrains from installing the installation target resource service application.

Next, in step S3.5, the resource service application management resource service application 830 stores the application definition file 1901 and the application 1902 acquired by decrypting the application file 1900 into the image forming apparatus 300 via the I/F of the resource service application management framework 800. At this time, the resource service application management resource service application 830 develops the application definition file 1901, and stores the storage location into the application management table 1920 together with the information of the resource service application ID, the version, and the like. Further, at this time, the resource service application management resource service application 830 registers the status "INSTALLED" in the application status 1925.

Next, the sequence for starting a resource service application will be described. Suppose that the resource service application 500 and the authorization server cooperation client 400 are already installed in the image forming apparatus 300.

In step S3.6, the user instructs the resource service application management resource service application 830 to start the authorization server cooperation client 400 with use of the Web browser provided in the not-illustrated personal computer (PC) or the Web browser 900 provided in the image forming apparatus 300. The resource service application management resource service application 830 locates the storage location of the authorization server cooperation client 400 based on the information in the resource service application management table 1920, and issues a resource service application activation start instruction via the I/F of the resource service application management framework 800.

Upon reception of the resource service application start instruction, the authorization server cooperation client 400 registers an interface for receiving a child token acquisition request to the resource service application management framework 800. Upon reception of the registration, the resource service application management framework 800 stores the interface. Upon completion of the registration of the interface, in step S3.8, the authorization server cooperation client 400 notifies the resource service application management framework 800 of the resource service application start in return.

In step S3.9, the resource service application management framework 800 changes the status 1925 of the authorization server cooperation client 400 to a started state, and stores a started resource service application object in a resource service application object list. The meaning of the resource service application object is the same as an instance which has the entity of a resource service application.

Next, in step S3.10, the user instructs the resource service application management resource service application 830 to start the resource service application 500 with use of the Web browser provided in the not-illustrated personal computer (PC) or the Web browser 900 (not illustrated) provided in the image forming apparatus 300. The resource service application management resource service application 830 locates the storage location of the resource service application 500 based on the information in the resource service application management table 1920, and issues a resource service application activation start instruction via the resource service application management framework 800. In step S3.11, upon reception of the resource service application start instruction, the resource service application 500 initializes the resource service application, and notifies the resource service application management framework 800 of the resource service application start in return. In step S3.12, the resource service application management framework 800 changes the status 1925 of the resource service cooperation resource service application 500 to "STARTED", and stores the started resource service application object into the resource service application object list.

According to the above-described sequences, the resource service application management framework 800 can start each resource service application installed in the image forming apparatus 300, and store the resource service application ID written in the application definition file 1901 of each resource service application in such a manner that the resource service application ID is referable from each resource service application object. Further, the resource service application management framework 800 can store an interface registered from another resource service application in an executable manner by receiving interface registration from the resource service application. At this time, as a method for registering an interface, the resource service application provides a class path (a reference path to a class definition) leading to a class in which the interface is defined.

Next, a sequence when the user accesses the resource service application screen of the resource service application 500 in step S2.3 will be described in detail. As described above, in step S2.4, the resource service application 500 acquires a login context. Then, in step S2.5, the resource service application 500 issues a token acquisition request to the authorization server cooperation client 400. At this time, in step S3.13, the resource service application 500 issues a request for acquiring the registered interface to the resource service application management framework 800. In step S3.14, upon reception of the interface acquisition request, the resource service application management framework 800 identifies the resource service application of the request source from the list of resource service application objects, and acquires the resource service application ID written in the application definition file 1901. According to the present exemplary embodiment, as a method for identifying the resource service application object that has issued the interface acquisition request, the authorization delegation system is configured in such a manner that the resource service application object is stored in an argument of the interface acquisition request as a reference. However, the method for identifying the resource service application object of the source of the interface acquisition request is not limited to the above-described method. For example, the resource service application object may be identified by using a function of reversely looking up the request source which is provided in the virtual machine 810.

Then, in step S3.15, the resource service application management framework 800 requests the authorization server cooperation client 400 to instantiate an interface definition class of the reference destination to generate an object based on the class path of the interface definition class registered by the registered authorization server cooperation client 400. At this time, the resource service application management framework 800 sets the acquired resource service application ID of the resource service application 500 in the object generation request. In step S3.16, upon reception of the object generation request, the authorization server cooperation client 400 generates an object of the interface definition class with the resource service application ID set therein, and transmits the object to the resource service application management framework 800 in return. Then, the resource service application management framework 800 transmits the generated object of the interface class to the resource service application 500 in return.

In step S2.5, upon reception of the interface object of the authorization server cooperation client 400, the resource service application 500 executes the token acquisition request defined in the interface definition class. In step S2.6, the authorization server cooperation client 400 acquires the resource service application ID set to the object of the interface definition class by which the token acquisition request is received. These sequences allow the authorization server cooperation client 400 to acquire the resource service application ID while preventing the resource service application ID from being altered by the resource service application.

According to the first exemplary embodiment, it is possible to issue a child token by a single authorization operation without requiring an authorization operation for each of a plurality of resource service applications in the same image forming apparatus 300, therefore the usability can be improved. Further, it is possible for the cloud service side to identify a resource service application that is the access source while preventing alteration.

The first exemplary embodiment of the present invention is described assuming that a parent token should be issued. However, the first exemplary embodiment of the present invention may be carried out in such a state that the authorization server cooperation client 400 manages a parent token for each user in advance. In this case, once the authorization server cooperation client 400 is installed in the image forming apparatus 300, a parent token can be used, so that the exemplary embodiment can handle the processing for issuing a child token, although it becomes difficult to deal with an increase in the number of users that use the image forming apparatus 300.

The first exemplary embodiment of the present invention is described based on the example in which the image processing service such as the form service and the print service is employed as the resource service. However, the present invention is not limited thereto. For example, the resource service may be another service such as a game resource service application and a music content distribution service. Further, the first exemplary embodiment of the present invention is described based on the example in which the image forming apparatus is employed as the image forming apparatus that is the terminal. However, the present invention is not limited thereto. For example, the image forming apparatus may be another image forming apparatus such as a smartphone or a music device. Further, the first exemplary embodiment of the present invention is described based on the example in which the resource service cooperation resource service application is the form application or the print application. However, the present invention is not limited thereto. For example, the resource service application 500 may be another application such as application management software or a music application. In this manner, there is no limitation on the respective entities for carrying out the present invention. Further, the first exemplary embodiment of the present invention is described assuming that a plurality of resource services is installed in the image forming apparatus 300, however only a single service may be installed in the image forming apparatus 300.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-214268 filed Sep. 27, 2012, which is hereby incorporated by reference herein in its entirety.

According to the present invention, it is possible to delegate authorizations to each one of a plurality of applications by a smaller number of times of authorization operations compared to the conventional technique.

What is claimed is:
1. An image forming apparatus connectable via a network with a server and configured to provide a resource service to an external apparatus connected via the network, the image forming apparatus comprising:
one or more processors and a memory storing one or more applications executable by the one or more processors, the one or more applications including:

a first application configured to acquire first authorization information issued by an authorization server approving delegation of a user's authorization for using the resource service;

a resource service application;

a second application configured to, in a case a request for acquiring authorization information is received from the resource service application, transmit the request to further delegate the authorization to the authorization server together with the first authorization information, and acquire second authorization information issued based on the first authorization information from the authorization server; and a framework application configured to manage a life cycle of the resource service application that operates in a resource service application execution environment provided by a virtual machine by managing a resource service application ID of the resource service application in a case where the resource service application is installed while confirming that the resource service application is not altered;

wherein the second application acquires the resource service application ID via the framework application, and the resource service application requests an object of an interface for calling the second application to the framework application, acquires the object of the interface to which the resource service application ID is set, and transmits the resource service application ID set to the interface to the second application together with the request for acquiring the authorization information defined in the object of the interface.

2. The image forming apparatus according to claim 1, wherein the resource service application is installed on top of an operating system of the image forming apparatus.

3. The image forming apparatus according to claim 1, wherein the second application automatically acquires the second authorization information from the authorization server.

4. The image forming apparatus according to claim 1, wherein information associated with the first authorization information and the second authorization information are managed while being associated with each other, and wherein the resource service application acquires the second authorization information from the second application and uses the resource service by using the acquired second authorization information instead of the first authorization information.

5. The image forming apparatus according to claim 1, wherein the second application acquires a resource service application ID of the resource service application and transmits the request for further delegating the authorization delegated from the user to the resource service application to the authorization server system together with the first authorization information and the resource service application ID, and the second application acquires the second authorization information managed in association with the resource service application ID from the authorization server.

6. The image forming apparatus according to claim 1, wherein, in a case the resource service application acquires the second authorization information from the second application and receives the resource service using the acquired second authorization information, and if a resource service application ID managed in association with the second authorization information transmitted from the resource service application is set to the server in advance, the resource service application receives the resource service.

7. The image forming apparatus according to claim 1, wherein the resource service application transmits a request for acquiring the authorization information to the second application in a case where a function required to use the resource service is requested by the user.

8. The image forming apparatus according to claim 1, wherein, if an expiration date of the first authorization information has been passed already, the second application transmits reissue information required to reissue the first authorization information, acquires newly issued first authorization information, and further acquires second authorization information issued based on the newly issued first authorization information from the authorization server.

9. The image forming apparatus according to claim 1, wherein the server is a server configured to provide at least one of image processing services including a print service and a form service, and including at least one image processing unit of a print unit and a scanner unit.

10. The image forming apparatus according to claim 1, wherein the image forming apparatus is controllable by a smart-phone.

11. A method for controlling an image forming apparatus connectable via a network with a server configured to provide a resource service to an external apparatus connected via the network, the method comprising:

acquiring, via a first application, first authorization information issued by an authorization server approving delegation of a user's authorization for using the resource service;

transmitting, via a second application and in a case where a request for acquiring authorization information is received from a resource service application, a request for further delegating the authorization to the authorization server together with the first authorization information, and acquires second authorization information issued based on the first authorization information from the authorization server;

managing, via a framework application, a life cycle of the resource service application that operates in a resource service application execution environment provided by a virtual machine by managing a resource service application ID of the resource service application in a case where the resource service application is installed while confirming that the resource service application is not altered, wherein the second application acquires the resource service application ID via the framework application, and the resource service application requests an object of an interface for calling the second application to the framework application, acquires the object of the interface to which the resource service application ID is set, and transmits the resource service application ID set to the interface to the second application together with the request for acquiring the authorization information defined in the object of the interface.

12. A non-transitory storage medium storing at least one application that, when executed by one or more processors causes an image forming apparatus to perform a method, the method comprising:

acquiring, via a first application, first authorization information issued by an authorization server approving delegation of a user's authorization for using the resource service;

transmitting, via a second application and in a case where a request for acquiring authorization information is received from a resource service application, a request for further delegating the authorization to the authorization server together with the first authorization information, and acquires second authorization information issued based on the first authorization information from the authorization server;

managing, via a framework application, a life cycle of the resource service application that operates in a resource service application execution environment provided by a virtual machine by managing a resource service application ID of the resource service application in a case where the resource service application is installed while confirming that the resource service application is not altered, wherein the second application acquires the resource service application ID via the framework application, and the resource service application requests an object of an interface for calling the second application to the framework application, acquires the object of the interface to which the resource service application ID is set, and transmits the resource service application ID set to the interface to the second application together with the request for acquiring the authorization information defined in the object of the interface.

* * * * *